United States Patent [19]
Uemichi et al.

[11] 3,838,327
[45] Sept. 24, 1974

[54] BATTERY POWERED EQUIPMENT

[75] Inventors: Sachio Uemichi; Kazuto Miyauchi; Susumu Nakao, all of Takatsuki, Japan

[73] Assignee: Yuasa Battery Company Limited, Takatsuki City, Osaka Prefecture, Japan

[22] Filed: Aug. 20, 1973

[21] Appl. No.: 389,812

Related U.S. Application Data
[63] Continuation of Ser. No. 185,686, Oct. 1, 1971, abandoned.

[52] U.S. Cl................... 320/2, 317/DIG. 5, 320/15, 320/40
[51] Int. Cl.............................................. H02j 7/00
[58] Field of Search.............................. 320/2, 5–9, 320/15–19, 25, 48, 40; 317/DIG. 5, 151, 23, 155

[56] References Cited
UNITED STATES PATENTS

| | | | |
|---|---|---|---|
| 2,959,717 | 11/1960 | Conger | 317/DIG. 5 |
| 3,097,334 | 7/1963 | Schimek | 320/40 |
| 3,308,365 | 3/1967 | St. John | 320/25 |

*Primary Examiner*—Miller: J. D.
*Assistant Examiner*—Robert J. Hickey
*Attorney, Agent, or Firm*—Watson, Cole, Grindle & Watson

[57] ABSTRACT

Portable battery powered equipment capable of being charged from an automobile accessory terminal, such as a cigarette lighter jack, is provided with a main relay to open and close the self-contained charging circuit which is designed to be switched ON at a preset voltage. A circuit includes a switching member and a resistor connected in series to one another and connected in parallel with the coil of a main relay. Variable resistors are connected in parallel with or disconnected with the resistor depending on the ON-OFF operation of the main relay. The charging operates such that an electric current flowing to the coil of the main relay is controlled to effect the OFF operation of the main relay when the battery cannot be substantially charged from an alternator or other external AC source.

2 Claims, 2 Drawing Figures

3,838,327

BATTERY POWERED EQUIPMENT

This is a continuation of application Ser. No. 185,686 filed Oct. 1, 1971 and now abandoned.

This invention relates to power equipment containing a built-in battery and more particularly to portable battery powered equipment.

There is known battery powered equipment which is charged from an A.C. supply by using a charger and can discharge electric power when it is used. In the case of moving from one place to another, or for use in an autocamp, or in the case of quickly starting, the battery will be discharged and will have to be charged. If there is no A.C. supply, the battery will not be able to be charged and the power equipment will not be able to be used. Further, there has been the disadvantage that, even if there is an A.C. supply, it may take such a long time to charge the battery that it will not be charged in time for an emergency. In order to use such a battery as an automobile booster battery for an emergency it is necessary to keep the battery always charged. However, it is very troublesome to keep the battery always charged by charging it from an A.C. supply.

The present invention is to eliminate the above mentioned conventional disadvantages.

A first object of the present invention is to provide portable battery powered equipment capable of being charged from a cigaret lighter jack of an automobile.

A second object of the present invention is to provide battery powered equipment charged from a generating mechanism of an automobile without discharging the battery mounted on the automobile.

A third object of the present invention is to provide battery powered equipment made so as to open and close a charging circuit in response to a set charging input terminal voltage.

A fourth object of the present invention is to provide battery powered equipment made so as to charge a plurality of batteries alternately.

The battery powered equipment according to the present invention has as its primary feature the capability of being charged from a cigaret lighter jack by utilizing excess power generated by an alternator of an automobile. Its structure and operation shall be explained in detail in the following description with reference to the drawings in which.

Figure 1:
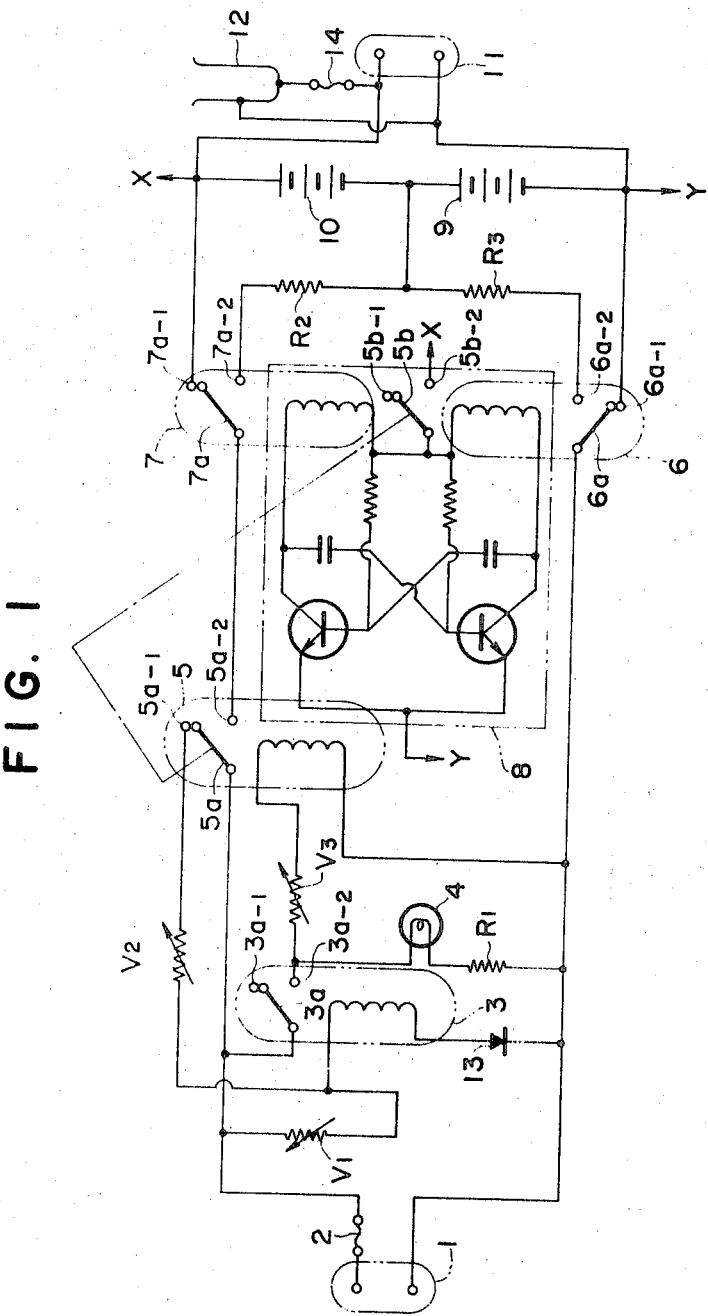
FIG. 1 is a wiring diagram showing an embodiment of the battery powered equipment according to the present invention.

In FIG. 1, 1 is an input terminal, 2 is an input fuse and 3 is a first relay whose operating voltage is set at 12.5 V. at ON and 12.6 V. at OFF. 3a is a movable contact, 3a-1 is a contact point on the OFF side, 3a-2 is a contact point on the ON side, 4 is a pilot lamp and 5 is a second relay used as a main relay whose operating voltage is set at 13.7 V. at ON. 5a and 5b are movable contacts. 5a-1 and 5b-1 are OFF side contact points. 5a-2 and 5b-2 are ON side contact points. 6 is a movable third relay. 6a is a contact. 6a-1 is an OFF side contact point. 6a-2 is an ON side movable contact point. 7 is a fourth relay. 7a is a contact. 7a-1 is an OFF side contact point. 7a-2 is an ON side contact point. 8 is an oscillator. In this embodiment, a symmetrical multivibrator oscillating square wave pulses is used. However, the present invention is not limited to such pulses. 9 and 10 are 6-V storage batteries. 11 is an emergency booster output terminal of an automobile. 12 is an output terminal mostly used for car accessaries. 13 is a diode. 14 is a fuse on the output side. $V_1$ to $V_4$ are variable resistors. $R_1$, $R_2$ $R_3$ are fixed resistors.

Continuing with FIG. 1, variable resistor $V_1$, the coil of the auxiliary relay 3, and diode 13 are connected in series to form a circuit in parallel with a terminal on the input side from the alternator. One end of variable resistor $V_2$ is connected with contact 5a-1 on the OFF side of the main relay and the other end is connected to be in parallel with variable resistor $V_1$ with movable contact 5a on contact 5a-1. The movable contact 3a of auxiliary relay 3 is connected in series with the coil of the main relay 5 through the variable resistor $V_3$ to form a circuit in parallel with input terminal 1. When auxiliary relay 3 is closed, electric current flows through pilot lamp 4 and resistor $R_1$ to indicate the ON state of auxiliary relay 3. Movable contact 6a of the third relay and movable contact 7a of the fourth relay, both movable contacts being operated alternately by oscillator 8 which is actuated by the power of batteries 9 and 10, are connected to the extreme ends of the charging circuit to be alternately in an OFF and an ON position. Contacts 6a-2 and 7a-2 are connected with each other through resistors $R_2$ and $R_3$. The junction between resistors $R_2$ and $R_3$ is connected to the junction between batteries 9 and 10. The end terminals of the series connected batteries are connected to the OFF side contacts 6a-1 and 7a-1, respectively.

Generally, if an electric current, for example, of 26m.A. flows to a coil in order that a contact of a relay may switch ON from OFF, the electric current will have to be diminished to about 7m.A. in order that the contact may then be switched OFF. Therefore, in the case of controlling the ON and OFF switching with one relay in response to the variation of the input terminal voltage, if the operating voltage of either ON or OFF is set, the operating voltage of the other will be also determined proportionally. Thus the respective operating voltages of ON and OFF can not be controlled individually and freely. For example, if the ON voltage is aV, the OFF voltage for the relay will be determined to be bV. Therefore, if a is determined, the relay will not be able to be switched OFF with any other voltage than bV.

In view of the above, in FIG. 1 of the present invention, the ON setting voltage is regulated by a second relay and the OFF setting voltage is mostly regulated by a first relay. For example, in case a voltage of 12V, for example such as an automobile alternator voltage, is impressed on the input terminal, the current will flow to the auxiliary first relay through the circuit in which the variable resistors $V_1$ and $V_2$ are connected in parallel but no current sufficient to close the first relay will flow. Therefore, the contact of the main second relay will not be operated and the charging circuit will remain open. Then, in case the input terminal voltage reaches 13V., as the ON setting voltage of the first relay is set at 12.5V., by the current flowing to the coil of the first relay, movable contact 3a will be switched to the contact point 3a-2 so as to be ON. But, as the current fed to the coil of the second relay does not reach a value sufficient to close the second relay, the charging circuit will remain cut off. When the input terminal voltage reaches 13.7V., the second relay will operate and movable contact 5a will contact 5a-2 to close the charging circuit. (As the second relay is regulated at an ON setting voltage of 13.7V., the current operating the second relay is fed to the coil.) Further, while the automobile is running, when the alternator is loaded and the voltage drops until the input terminal voltage becomes 12.6V. (i.e., no charging can be substantially effected from the alternator), the first relay will operate, movable contact 3a will return to the position of 3a-1 to be OFF, at the same time the current to the coil of the second relay will be cut off and therefore contact 5a-1 is contacted to cut off the charging circuit. That is to say, as the second relay is regulated by the ON setting voltage, the difference between the OFF voltage corresponding to it and the ON voltage is so large that the charging circuit must be cut off before it reaches the OFF voltage of the second relay itself. Therefore, the control of the current feed to the coil of the second relay is formed by a control circuit consisting of the first relay and variable resistors. That is to say, the variable resistor $V_2$ connected to the OFF contact point of the second relay is connected in parallel with the variable resistor $V_1$ and is connected with the first relay coil. Further, when the second relay switches OFF from the closed charging circuit, as the variable resistor $V_2$ is an open circuit (movable contact 5a is in the position of 5a-2), the variable resistor $V_1$ will be connected in series with the coil. As the OFF voltage of the first relay is set at 12.6V., the relay will operate with this voltage to be OFF. When the first relay is OFF, the variable resistor $V_2$ will be connected in parallel with the variable resistor $V_1$ and, as a result, the combined resistance value will be smaller than the resistance value of the variable resistor $V_1$, therefore the current flowing to the coil of the first relay will increase and the first relay will be ON. However, it will be understood from the above that the second relay which is once OFF will not be ON unless a voltage of 13.7V. (a current of 26 $m.A.$) is reached.

If a high voltage at which the second relay is ON drops to a voltage of 12.6V. at which the first relay is OFF, the OFF current of the relay is 7 $m.A.$, the input terminal voltage is 12.6V. and the coil resistance of the relay is 120 Ω, $$V_1 = 12.6 \text{ (V)}/0.007 \text{ (A)} - 120 = 1680 \text{ Ω}$$

When the low voltage at which both the first and second relays are OFF rises to a voltage of 12.5V. at which the first relay is ON, the ON current of the relay is 26 $m.A.$, the input terminal voltage is 12.5 and the coil resistance is 120 Ω, total resistance $R = 120 + V_1 \cdot V_2/V_1 + V_2$
(wherein $V_1 \cdot V_2/V_1 + V_2$ is a combined resistance value of $V_1$ and $V_2$),
R = 12.5 (V)/0.026 (A)   480 Ω
wherein $V_1$ is 1680 Ω and
Therefore, $$V_2 = \frac{1}{\frac{1}{480-120} - \frac{1}{1680}} = 458 \text{ Ω}.$$

If the resistance values of the variable resistors $V_1$ and $V_2$ are adjusted to be respectively 1,680 and 458 Ω, when the input terminal voltage becomes 12.5V., of the contact the first relay will be ON and, when it becomes 13.7V., the second relay will be ON and the charging circuit will be closed. Thereafter, if the voltages drops to 12.6V., the first relay will be OFF thereby in turn cutting off the second relay. By the above mentioned formation, when the charging circuit is ON, that is, movable contact 5a is in the position of 5a-2 and, movable contact 5b will contact 5b-2 so as to be ON. Then, by means of batteries 9 and 10, the oscillator (multivibrator) 8 will operate to generate symmetrical square wave pulses. When the oscillator operates, a current will flow to only either one of the third and fourth relays and movable contacts 7a or 6a will be in its respective ON position.

For example, if movable contact 7a of the fourth relay is ON, the charging current will flow from $R_2$ to the battery 9 which will be charged. With the lapse of time, if the pulses reverse, the fourth relay will become OFF, the third relay will be ON, the charging current will charge and flow from the battery 10 to $R_3$ and the battery 10 will be charged. As the third and fourth relays operate ON and OFF alternately at regular time intervals with the oscillator providing square wave pulses as mentioned above, the 6-V. batteries 9 and 10 can be uniformly charged. It is one of the features of the present invention that a plurality of batteries connected in series are thus divided and charged alternately by 6V. by operating a device switching the charging alternately with a movable contact switch operatively connected with the contact of the relay. That is to say, if the build-in battery contained in the power equipment is of the same potential as of the automobile battery (Generally 12V.), due to the voltage drop of the contact resistance of the cigaret lighter jack or the resistance between the wires, the charging current will become so small that charging will not only be required for a long time but also full charging will be difficut. Further, if the charging apparatus is to be applied mostly to car accessories or to an emergency booster battery for an automobile, it will be desirable that the output potential of the power supply should be the same potential as the battery of the automobile. In consideration of these points, in this embodiment, the 6-V batteries 9 and 10 are connected in series with each other and are connected to the OFF side contacts of the third and further relays. Further, the resistors $R_2$ and $R_3$ are connected in series with each other and are connected to the ON side contact of the third and fourth relays. The junction of the above mentioned 6-V. batteries 9 and 10 is connected with the junction of the resistors $R_2$ and $R_3$. Therefore, at the time of charging, if the 6-V, batteries 9 and 10 are alternately charged, the voltage difference between the input terminal voltage and the battery voltage will be so large that a large charging current will be able to be made to flow and rapid charging will be accomplished. At the time of discharging, the 6-V. batteries 9 and 10 will be able to be directly discharged so that the same potential 12V. as of the battery of the automobile may be obtained.

Further, it is possible to charge two 6-V. batteries connected in parallel and to switch them to be in series in discharging them so as to use them with 12V. However, in such a process, a switching operation is required in the case of charging and discharging. Further, in the case of charging them in parallel, the charges of the individual batteries will be likely to be unbalanced. Further, in the case of using them as a booster battery, generally such large current as of about 100 to 150A. will flow and therefore there will be a disadvantage in that the interposition of a charge-over switch in the output circuit will be infeasible.

Figure 2:
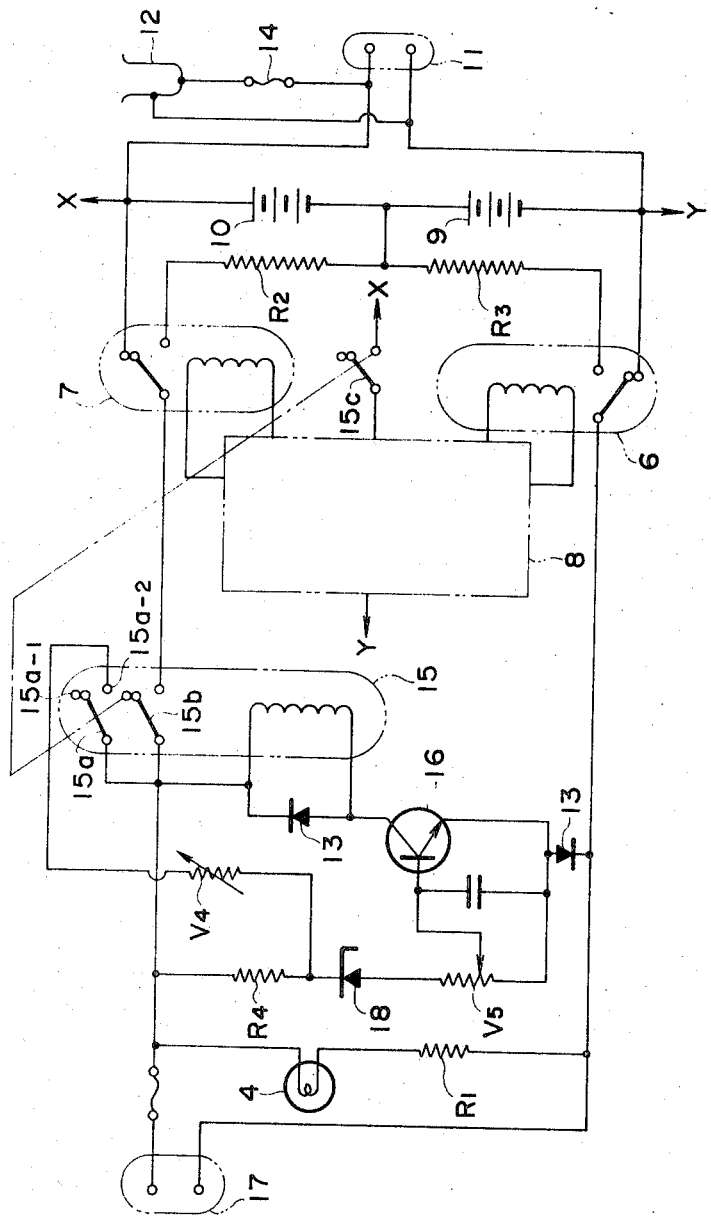
FIG. 2 is a wiring diagram showing another embodiment of the battery powered equipment according to the present invention.

Now another embodiment of the present invention shall be explained with reference to FIG. 2 in which 15 is a main relay having operatively connected movable contacts 15a to 15c., 15a-1 is an OFF contact, 15a-2 is an ON contact, 16 is a transistor having a current amplifying characteristic, 17 is an input terminal, 18 is a constant voltage diode, $V_4$ and $V_5$ are variable resistors, $R_4$ is a fixed resistor and the other components are the same as in FIG. 1.

A circuit formed by the connection of resistor $R_4$, constant voltage diode 18 and potentiometer $V_5$ from one terminal of input terminal 17 is connected to the base of transistor 16. The collector of transistor 16 is connected through the coil of main relay 15 to the aforesaid one terminal. Diode 13 is connected in parallel with the coil for protecting the coil during those intervals when reverse current flow is induced by reverse voltage swings of the relay coil. The emitter of transistor 16 is connected to the other terminal of input terminal 17 through diode 13' for preventing reverse current flow, which is more fully described hereinafter. The resistor $R_4$ is connected such that when main relay 15 is OFF, variable resistor $V_4$ is cut off, and when the main relay is ON, variable resistor $V_4$ is connected in parallel with resistor $R_1$.

When the main relay is OFF, the variable resistor $V_4$ will be connected to the ON contact, therefore the circuit will be opened and a current will flow to the resistor $R_4$ - constant voltage diode 18 - variable resistor $V_5$. Then, if the resistance value of the variable resistor $V_5$ is adjusted so that, if the input terminal voltage becomes, for example, 13.7V., a current of 26 $m.A$. may flow to the coil of the relay, the current will be impressed on the base of the transistor and the amplified current will flow between the emitter and collector. By this ON current, the movable contact of the relay 15 will be in the ON position. Thus the charging circuit of the battery will be closed and the battery will be charged in the same manner as in the case of FIG. 1.

When the movable contact of the relay is in the ON position, the resistor $R_4$ and the variable resistor $V_4$ will be connected in parallel with each other. This fact plays an important role in responding to the following OFF setting voltage of 12.6V. That is to say, when the input terminal voltage drops to 12.6V. from the ON state (charging state), the difference from the voltage of 13.7V. at which the movable contact of the relay is in the ON position will be 1.1V. Due to this reduction of 1.1V., the current flowing to the coil of the relay by the amplification factor of the transistor will decrease greatly from the OFF setting current value of 7 $m.A$. of the relay. In order to reduce the great reduction of the current, the variable resistor $V_4$ is connected to the ON contact of the relay so that the resistance value of the base circuit may decrease when the movable contact of the relay is in the ON position. Therefore, by varying the resistance value of $V_4$, the current value flowing to the coil of the relay can be freely varied and the OFF condition of the relay can be set to any set voltage. That is, these circuits are a control device to open and close the relay.

More specifically, when the base current flows the amplified current switches the main relay ON and after the main relay is once switched ON, and the alternator voltage reaches such a value that it is insufficient for charging, the base current becomes less than the operating current, thereby the collector current becomes very small and the main relay is switched OFF. This can be done by the following steps. When the main relay is OFF, a relatively small current is fed as variable resistor $V_4$ is not in parallel with resistor $R_4$. Then, when the voltage at the input terminal increases to the ON setting voltage of the main relay, the main relay is switched ON, as the base current is increased to cause current flow between the collector and the emitter. When the main relay is switched ON, as variable resistor $V_4$ is connected in parallel with resistor $R_4$ to feed a relatively large current to the base, even if the voltage at the input terminal becomes lower than the ON voltage, the main relay is held in the ON state. When the voltage of the alternator reaches such a value that no charging can substantially be effected therefrom, the main relay is switched OFF, as the base current is insufficient for transistor 16 to conduct.

Generally, the alternator and battery of an automobile are connected in parallel with each other with respect to the load so that, in case the power generated by the alternator can not respond to the load, the additional power may be fed from the battery. Therefore, in case the battery of the power equipment according to the present invention is charged by utilizing only the excess power generated from the alternator, when the battery of the automobile is discharged, the charging of the power equipment may be stopped. The battery of the automobile used here is usually 12V. In order that the battery may be discharged, it is necessary that the potential applied to the terminal should be less than 12.6V. Therefore, in order to satisfy the above mentioned condition, when the input terminal voltage of the power equipment becomes less than 12.6V., the charging circuit will be cut off. Further, in case a charging load is taken, a voltage drop will occur. For example, if a charging load of 3 to 4A. is taken, a voltage drop of about 0.4V. will occur (as a result of an experiment with an automobile of a displacement of 1,000 to 1,500 c.c. and a mounted alternator output of 300W). Further, the alternator voltage of the automobile is controlled usually to be 14.5 ± 0.5V. with a regulator.

From the above, it is proper to set the charging OFF voltage at about 12.0 to 12.6V. and the charging ON voltage at about 13.1 to 13.9V.

It is desirable to set the ON voltage at 13.1 to 13.9V. The automobile regulator set voltage is 14.5 ± 0.5V. and therefore can be 14.0V. Therefore, in case it is more than 13.9V., the charging circuit may not be ON.

Further, if the charging circuit is ON at 13.1V., a voltage drop of about 0.4V. will occur. Therefore, at the moment of charging ON, 13.1V − 0.4V = 12.7V. If it is less than 12.7V., it will be a limit of charging OFF and therefore charging ON/charging OFF will be repeated and so-called chattering will occur.

It is also desirable to set the OFF voltage at 12.0 to 12.6V. The condition of the discharge of the automobile battery is 12.6V. In case the battery of the automobile is discharged, the voltage will drop to about 12V. within a short time due to the discharge current. In the case of 12.0V., the amount of discharge from the battery of the automobile will be very slight and the charge can be switched OFF. If it is less than that, the time until the charging switching OFF will be long and the amount of discharge from the battery of the automobile will become large. Therefore, it is proper to keep the discharge voltage at about 12V.

The general charging operation of the battery powered equipment of the present invention is as follows. First of all, the input terminal 1 is connected to the cigaret lighter jack of the automobile. As the battery voltage of the automobile is 12.6V., an electric current will flow to the coil of the relay 3 through the variable resistors $V_1$ and $V_2$ and, first movable contact 3a of the first relay 3 will be in the ON position. At the same time, the pilot lamp will be energized and the current will flow also to the coil of the second relay 5 through the variable resistor $V_3$. When the engine of the automobile is started, the alternator operates and the input terminal voltage rises and reaches 13.7V., the movable contacts 5a and 5b of the second relay 5 will be in the ON position. At the same time, the oscillator 8 will operate and the movable contact of the third relay 6 will be in the ON position. The charging current will flow to the OFF contact of the fourth relay through battery 10 and $R_3$ so that the battery 10 may be charged. If the above mentioned charging current flow is 3 to 4A., a voltage drop of about 0.4V. from the input terminal voltage will occur and the voltage will be 13.3V. However, as the OFF voltage of the first relay 3 is 12.6V., the charging will be continued as it is. With the lapse of time, if the movable contact of the third relay 6 switches OFF and the movable contact of the fourth relay 7 switches ON, the charging current will flow through $R_2$ to battery 9 so that the battery 9 may be charged. As mentioned above, with the lapse of time, the batteries 9 and 10 will be alternately charged. Meanwhile, if the number of revolutions of the engine reduces, and any other loads (such as lights and buzzers) are used, the input terminal voltage becomes less than 12.6V. and thus the battery of the automobile will be discharged, the movable contact 3a of the first relay 3 will switch OFF, the coil current of the second relay 5 will be cut off, therefore the movable contact 5a of the second relay 5 will switch OFF and the charging will be stopped.

In some automobiles, the plus terminal is ground and there is a possibility that the input terminal may be reversely connected with respect to the plus and minus terminals. In such a case, the oscillator will not operate and therefore the movable contacts of both the third and fourth relays will be in the OFF position. Therefore, the 6-V. batteries 9 and 10 connected in series will be short-circuited and a large current will flow.

However, at the same time, a great voltage drop will occur, therefore the movable contact of the first relay will switch OFF and the charging will be cut off. When it is cut off, the voltage will recover, the movable contact of the second relay will again switch ON and a large current will flow. As the above mentioned repetition is made while the input side fuse is open, there may be such great disadvantages, for example, such as the contacts of the relay will be damaged by heat and the commutating element of the alternator will be damaged.

Moreover, in the present invention, as the diode 13 is interposed in the coil circuit of the relay, even if the plus and minus terminals are reversely connected, no current will flow to the coil of the relay and the movable contact of the relay will not switch ON. Therefore no current will flow to the charging circuit and the above mentioned troubles can be prevented. Further, as the diode 13 is interposed in the coil circuit, there is an advantage that a diode of a small capacity can be used. In this embodiment, in case the oscillator always operates as well as during the charging, there will be a possibility that it will be damaged early.

In the equipment of the present invention, as the movable contact 5a with which the charging circuit switches ON and the movable contact piece 5b with which the input circuit of the oscillator switches ON are operatively connected, unless the charging circuit switches ON, the oscillator will not operate. Therefore, the above mentioned possibility can be eliminated.

It is desirable that such battery powered equipment can be charged as a portable battery also from an A.C. supply in those instances where it can not be sufficiently charged during only the running time of the automobile as, for example, in the case of short travel times.

In the present invention, in case no input terminal voltage is impressed, the 6-V, batteries 9 and 10 will be connected in series with each other and will be connected at to the ON contact of the second relay through the movable contact of the third relay.

Therefore, if another charger is connected to the output terminal, the equipment of the present invention will be freely charged even from an A.C. supply and will be able to be discharged at the same time in that state. That is to say, "floating" is possible and therefore the uses of the equipment are further expanded.

As described above, the battery powered equipment of the present invention not only can be charged with the excess power generated from the alternator by utilizing the cigaret lighter jack of the automobile but also can be charged quickly with a comparatively large charging current and can be charged and discharged without requiring a switching operation. Further, at the time of an emergency of the automobile, it can be used to discharge a large current, for example, as a booster battery. If another charger is connected, it will be charged even from an A.C. supply and will be able to be used in a floating state. As it can be made comparatively small, it is convenient to carry.

Further, the equipment of the present invention can be used built-in or combined with a small commercial generator. For example, an A.C. generator of 100V. will be able to be charged from the discharging terminal part of the equipment of the present invention if another charger is interposed. A D.C. generator of 12V. will be able to be used as it is if a D.C. of 12V. is put directly into the above mentioned discharging terminal part.

What is claimed is:

1. Battery charging apparatus comprising: a main relay for actuating and de-actuating said apparatus at respective pre-set ON and OFF voltages of a charging source; said ON voltage is greater than said OFF voltage; a switching member for de-actuating said main relay at said OFF voltage; a circuit for controlling said switching member and including a first resistor and a second resistor connected in parallel with or cut-off from said first resistor by the ON-OFF operation of said main relay for regulating said switching member to effect the OFF operation of said main relay, said switching member includes a transistor having a base connected to said first resistor, a collector connected to the coil of said main relay, said main relay includes ON and OFF contact members, and said second resistor is connected to said ON contact member, whereby said first resistor and said second resistor are connected in parallel when said main relay is ON and when said main relay is OFF said second resistor is disconnected; said transistor is biased so that the coil of said main relay is actuated at said set ON voltage and the coil of said main relay remains actuated with the voltage of said charging source less than said set ON voltage, and said transistor is shut off with the voltage of said charging source voltage at said OFF voltage by the current through said parallel resistors when said charging source has a voltage less than said set voltage, whereby said main relay is de-actuated.

2. Battery charging apparatus comprising: a main relay for actuating and de-actuating said apparatus at respective pre-set ON and OFF voltages of a charging source; said ON voltage is greater than said OFF voltage; a switching member for de-actuating said main relay at said OFF voltage; a circuit for controlling said switching member and including a first resistor and a second resistor connected in parallel with or cut-off from said first resistor by the ON-OFF operation of said main relay for regulating said switching member to effect the OFF operation of said main relay, said switching member is an auxiliary relay having a contact member and coil, said coil is connected in series with said first resistor, said contact member is connected directly to the coil of said main relay; said main relay includes ON and OFF contact members, and said second resistor is connected to said OFF contact member, whereby said first resistor and said second resistor are connected in parallel when said main relay is OFF and when said main relay is ON said second resistor is disconnected; said auxiliary relay is ON when the voltage from the charging source reaches a set voltage proper for charging said auxiliary relay, said auxiliary relay switches said main relay ON when the voltage from charging source reaches a set voltage proper for charging said main relay, and said auxiliary relay is switched OFF by the current through said first resistor when the charging source has a voltage less than said set voltage, whereby said main relay is de-actuated.

* * * * *